US012112106B2

(12) United States Patent
Cao et al.

(10) Patent No.: US 12,112,106 B2
(45) Date of Patent: Oct. 8, 2024

(54) MEDIA PARAMETER-MODIFIED METHOD FOR REALIZING AN ADAPTIVE EXPRESSION OF AN ARBITRARY DISCONTINUOUS SURFACE

(71) Applicant: Institute of Geology and Geophysics, Chinese Academy of Sciences, Beijing (CN)

(72) Inventors: Jian Cao, Beijing (CN); Shoudong Huo, Beijing (CN); Xuhui Zhou, Beijing (CN); Taikun Shi, Beijing (CN); Liang Huang, Beijing (CN); Jiaru Zou, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 673 days.

(21) Appl. No.: 17/393,317

(22) Filed: Aug. 3, 2021

(65) Prior Publication Data

US 2023/0020158 A1   Jan. 19, 2023

(30) Foreign Application Priority Data

Jul. 7, 2021  (CN) .......................... 202110768611.0

(51) Int. Cl.
*G06F 30/23* (2020.01)
*G01V 1/30* (2006.01)
*G06F 111/10* (2020.01)

(52) U.S. Cl.
CPC ................ *G06F 30/23* (2020.01); *G01V 1/30* (2013.01); *G01V 2210/64* (2013.01); *G06F 2111/10* (2020.01)

(58) Field of Classification Search
CPC ...... G06F 30/00; G06F 30/23; G06F 2111/10; G01V 1/30; G01V 2210/64; G01V 1/01;
(Continued)

(56) References Cited

FOREIGN PATENT DOCUMENTS

| CN | 102749643 A | 10/2012 |
|----|-------------|---------|
| CN | 103562749 A | 2/2014  |

(Continued)

OTHER PUBLICATIONS

Cao, Jian et al., "A Parameter-Modified Method for Implementing Surface Topology in Elastic-Wave Finite-Difference Modeling", Nov.-Dec. 2018, Geophysics, vol. 83, No. 6. (Year: 2018).*

(Continued)

*Primary Examiner* — Cedric Johnson

(57) ABSTRACT

A media Parameter-modified method for realizing an adaptive expression of an arbitrary discontinuous surface, comprising the following steps: importing an initial forward model, importing anisotropic parameters; and setting a space step and a time step according to the initial forward model parameters; and then starting a stepped discretization of a free surface of the initial forward model; and using a corrected constitutive relationship to correct a first level parameter of the initial forward model; and bringing the corrected constitutive relationship into a displacement stress equation, and the influence of the free surface can be introduced in the case of the anisotropic media after series of operation. The present disclosure can make an accurate numerical simulation of a wave field near the discontinuous surface, and the accurate numerical simulation will contribute to the extraction and analysis of information from the seismic data.

5 Claims, 3 Drawing Sheets

(58) Field of Classification Search
CPC .. G01V 1/282; G01V 1/306; G01V 2210/626; G01V 2210/641
USPC ........................................................ 703/2, 6
See application file for complete search history.

(56) References Cited

FOREIGN PATENT DOCUMENTS

| | | | | |
|---|---|---|---|---|
| CN | 207283763 U | | 4/2018 | |
| CN | 207304845 U | | 5/2018 | |
| CN | 105264428 B | | 6/2018 | |
| CN | 110187379 A | * | 8/2019 | |
| GB | 2510338 A | * | 8/2014 | ............... G01V 1/30 |

OTHER PUBLICATIONS

Title of the Item: Geophysical Prospecting for Petroleum Publication Date: Jul. 25, 2018 Name of the Author: Cao Jian et al. Article Title: Adaptive free-surface expression for elastic wave finite-difference modeling pp. 522-530.

* cited by examiner

MEDIA PARAMETER-MODIFIED METHOD FOR REALIZING AN ADAPTIVE EXPRESSION OF AN ARBITRARY DISCONTINUOUS SURFACE

CROSS-REFERENCE TO RELATED APPLICATIONS

The application claims priority to Chinese patent application No. 202110768611.0, filed on Jul. 7, 2021, the entire contents of which are incorporated herein by reference.

TECHNICAL FIELD

The present disclosure belongs to the technical field of seismic exploration, and in particularly relates to a media Parameter-modified method for realizing an adaptive expression of an arbitrary discontinuous surface.

BACKGROUND

In seismology, places where sudden changes occur during the propagation of an earthquake is usually regarded as discontinuous surface. According to the physical properties (solid, fluid and gas) of the media on both sides of the discontinuous surface, the discontinuous surface can be divided into the following four categories: 1) solid-solid discontinuous surface; 2) solid-fluid discontinuous surface; 3) solid free surface (land surface), which is also called solid-vacuum discontinuous surface; 4) fluid free surface (sea level), which is also called fluid-vacuum discontinuous surface. Complex wave conversion phenomena and interface wave generation with strong-energy occur near above discontinuous surfaces. For example, the solid-fluid discontinuous surface is often used to describe the seabed interface or the inner and outer nuclear boundary of the earth, and a Scholte wave that propagates along the interface will be generated near the solid or fluid discontinuous surface as well as the occurrence of P-S wave conversion, and a strong amplitude surface wave (Rayleigh wave or love wave) will be generated, and dispersion features of the solid or fluid discontinuous surface are of great significance and use in near-surface seismic exploration. The fluid free surface which is used to describe the marine surface is the reason for multiple waves occurrence in marine exploration, and the fluid free surface can be regarded as noise to be removed (multiple wave de-noising technology), and it can also be used for illumination and area compensation (multiple wave imaging technology).

In the numerical simulation of the complex medium seismic waves, a combination of the above discontinuous surface is often occurred, and the correct numerical modeling expression of the discontinuous surfaces will directly affect the accuracy and precision of the numerical simulation, especially for surface observation seismic data and seabed seismograph observation seismic data, whose geophones and seismometers are directly located on or near the discontinuous surface, are more affected by the discontinuous surface. Whether the numerical simulation of the wavelength near the discontinuous surfaces can be performed correctly will directly affect the extraction and analysis of information from the surface observation seismic data and seabed seismograph observation seismic data.

In addition, the discontinuous surface will also destroy the integrity of some numerical discretization methods. For example, algorithms based on the strong solutions form of partial differential equations such as a finite difference method and a pseudo-spectral method. At present, the most commonly used seismic numerical simulation technology in industry and scientific research is the finite difference method, whose applicable range is medium with uniform parameters or smooth change parameters, and when the finite difference method is directly applied to the discontinuous surface with a strong impedance comparison, the calculation will be unstable, the numerical illusion will be generated and the calculation accuracy will be reduced, and as a result, the accuracy of the final simulation result will be affected.

At present, a direct discretization boundary condition is generally used, and a control derivative in the boundary conditions is approximated in the difference form. Take the realization of the solid free surface as an example, there are approximate format for central difference display (Alterman and Karal, 1968), unilateral display approximate format (Vidale and Clayton, 1986) and composite approximate format (Ilan et al., 1975; Ilan and Loewenthal, 1976; Lan and Zhang, 2011). In addition, operate the stress tensor and the velocity vector separately under the first-order velocity-stress equation expression, and take the realization of the solid free surface as an example, there are vacuum format (Zahradnik et al., 1993; Bohlen and Saenger, 2006), stress image method (Levander, 1988; Graves, 1996; Kristek et al., 2002) and some media average method (Mittet, 2002; Xu et al., 2007); What's more, there is a discretization method based on Mimetic arithmetic operators such as dela Puente et al. (2014), Shragge and Tapley (2017), Konuk and Shragge (2020), Shthi et al. (2021). In addition to above three methods, there is a limit class method, and the limit class method includes a primeton method (Komatitsch and Tromp, 1999; Komatitsch et al., 1999; Tromp et al., 2008; Peter et al., 2011). The numerical simulation method based on weak solution form of partial differential equation can refer to the present primeton open-source program package: SPECFEM2D and SPECFEM3D.

However, the present technology has the following problems: 1) A forward simulation applied to the high Poisson ration media will led to an unstable calculation, and can only reach the second-order calculation accuracy. In the case of cross-section fluctuations, the calculation stability of the forward simulation will also be affected by the maximum curvature of the cross-section. The larger the curvature, the harder the forward simulation is to be stable; 2) The calculation accuracy, which is low, is affected by the changes in Poisson ration; and when the cross-section fluctuations happen, the symmetrical operations on the interface required by the physical fields on both sides of the cross-section become extremely complicated; 3) Since the calculation is complex, extra memory controls are required to store a set topology variable, and the calculation stability of the forward simulation will also be affected by the maximum curvature of the cross-section. The larger the curvature, the harder the forward simulation is to be stable; 4) Compared with numerical simulation technology based on the finite difference method, the algorithm theory is complicated to implement, the calculation amount is large, and the memory consumption is high.

SUMMARY

A media Parameter-modified method for realizing an adaptive expression of an arbitrary discontinuous surface, comprising the following steps:

S1: importing an initial forward model, and the initial forward model includes a velocity and a density of vertical and horizontal waves, setting a seismic wavelet type and a main frequency parameter, and setting a space step and a time step according to initial forward model parameters;

S2: selecting the space step and the time step according to the initial forward model parameters; and setting a differential order-number and a seismic wavelet;

S3: starting a stepped discretization of a free surface of the initial forward model when a surface of the initial forward model fluctuates, and turning an irregular undulating ground into a regular stepped grid;

S4: using the media Parameter-modified method to correct a constitutive relationship and a density of non-horizontal points on the free surface;

S5: using a corrected constitutive relationship to replace an original constitutive relationship on the free surface, and an influence of the free surface can be introduced without correcting an original finite difference method code;

S6: for generalized anisotropic media, including orthorhombic anisotropic media and triclinic anisotropic media, bringing the corrected constitutive relationship into a finite difference method code can introduce the influence of the free surface.

Further, the free surface includes a fluid free surface and a solid free surface.

Further, a discontinuous surface includes a fluid-solid discontinuous surface and a fluid-vacuum discontinuous surface.

Further, for the anisotropic media, anisotropic parameters need to be imported.

Further, the anisotropic media is suitable for a solid free surface part.

The media Parameter-modified method for realizing an adaptive expression of an arbitrary discontinuous surface can be directly inherited and applied to the existing mainstream velocity-stress staggered grid finite fractional numerical program in the industry and academia, and the method can accurately fit the spatial position of the discontinuous surface because the method has no traditional grid offset error. The method can be achieved by simply correcting the media parameters of the grid points near the discontinuous surface, and the correction process only needs to be done once, the calculation is efficient and the operation is simple. The method can be applied to the high-order finite difference operator, achieving calculation accuracy equivalent to that based on the precise implementation of the weak solutions form of partial differential equations. At the same time, this method is suitable to deal with various common anisotropic media free surface, such as VTI, HTI, TTI media, etc. Further, it can be extended to generalized anisotropic media, such as orthorhombic anisotropic media, triclinic anisotropic media, etc. The method is adaptive to Poisson's ratio for both isotropic and anisotropic media.

DETAILED DESCRIPTION OF THE EMBODIMENTS

Figure 1:
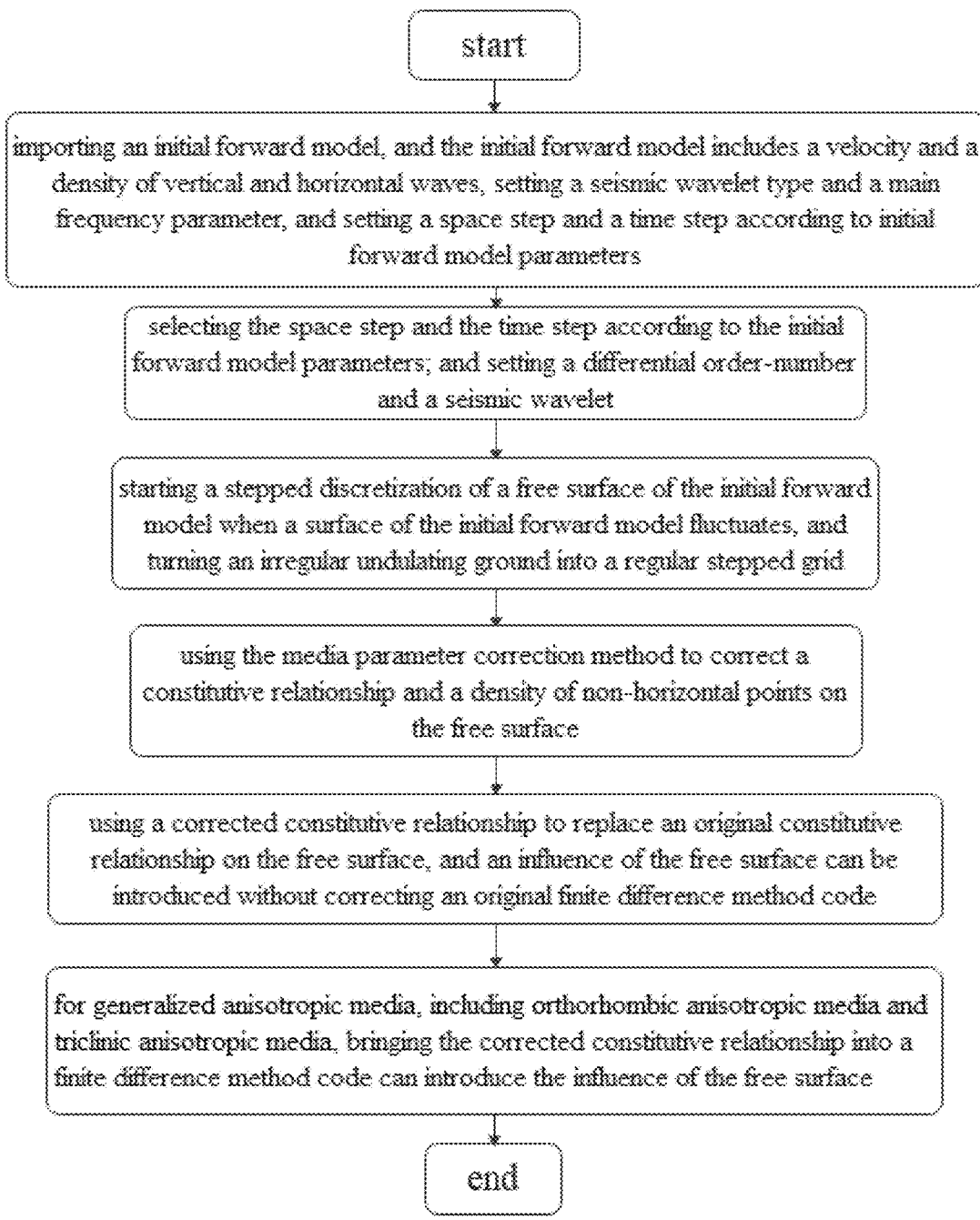
FIG. 1 is a flow chart of the media Parameter-modified method for realizing an adaptive expression of an arbitrary discontinuous surface in an embodiment of the present disclosure.

In order to make the objects, technical solutions, and advantages of the present disclosure clear, the present disclosure will be further described in detail below with reference to the embodiments and drawings. The exemplary embodiments of the present disclosure and the description thereof are only used to explain the present disclosure, not as a limitation of the present disclosure.

A media Parameter-modified method for realizing an adaptive expression of an arbitrary discontinuous surface, comprising the following steps:

S1: importing an initial forward model, and the initial forward model includes a velocity and a density of vertical and horizontal waves, setting a seismic wavelet type and a main frequency parameter, and setting a space step and a time step according to initial forward model parameters;

S2: selecting the space step and the time step according to the initial forward model parameters; and setting a differential order-number and a seismic wavelet;

S3: starting a stepped discretization of a free surface of the initial forward model when a surface of the initial forward model fluctuates, and turning an irregular undulating ground into a regular stepped grid;

S4: using the media Parameter-modified method to correct a constitutive relationship and a density of non-horizontal points on the free surface;

S5: using a corrected constitutive relationship to replace an original constitutive relationship on the free surface, and an influence of the free surface can be introduced without correcting an original finite difference method code;

S6: for generalized anisotropic media, including orthorhombic anisotropic media and triclinic anisotropic media, bringing the corrected constitutive relationship into a finite difference method code can introduce the influence of the free surface.

Further, a discontinuous surface includes a fluid-solid discontinuous surface and a fluid-vacuum discontinuous surface; and the anisotropic media is suitable for solid free surface part.

Further, for the solid-fluid discontinuous surface, the constitutive relationship corresponding to a solid media 1 is assumed to be $\tau^{-M1}=E^{M1}(\lambda_1, \mu_1)\varepsilon^{-M1}$, the constitutive relationship corresponding to a solid media 2 is $\tau^{-M2}=E^{M2}(\lambda_2, \mu_2)\varepsilon^{-M2}$. According to an average media thought, two connected media can be equivalent to an equivalent average media, and the constitutive relationship of the equivalent average media is $\tau^{-A}=E^{A}(\lambda_1,\mu_1,\lambda_2, \mu_2)\varepsilon^{-A}$. Similarly, for the solid-fluid discontinuous surface, the constitutive relationship corresponding to a fluid media 1 is supposed to be $\tau^{-M1}=E^{M1}(\lambda_1,\mu_1)\varepsilon^{-M1}$, the constitutive relationship corresponding to a fluid media 2 is $\tau^{-M2}=E^{M2}(\lambda_2,0)\varepsilon^{-M2}$. According to the average media thought, two connected media can be equivalent to the equivalent average media, and the constitutive relationship of the equivalent average media is $\tau^{-A}=E^A(\lambda_1,\mu_1,\lambda_2,0)\varepsilon^{-A}$.

In the formula above, $\tau$ refers to a stress tensor matrix, M1 refers to a elastic media 1, M2 refers to a elastic media 2, A refers to the average media, E refers to a equivalent elastic coefficient matrix, $\lambda_1$, $\lambda_2$ and $\mu_1$, $\mu_2$a refer to a Lame constants, and $\varepsilon$ refers to a matrix of strain.

Further, for the solid free surface such as the land surface, which are also called solid-vacuum discontinuous surface, the constitutive relationship of an upper vacuum media is assumed to be $\tau^{-M1}=E^{M1}(\lambda_1,\mu_1)\varepsilon^{-M1}$, and according to $\lambda_1 \to 0, \mu_1=0$, the constitutive relationship of a sublayer solid media is $\tau^{-M2}=E^{M2}(\lambda_2,0)\varepsilon^{-M2}$, the constitutive relationship of the equivalent average media is $\tau^{-A}=E^A(\lambda_1,\mu_1,\lambda_2,\mu_2)\varepsilon^{-A}$, and $\lambda_1 \to 0, \mu_1=0$.

Further, for a sublayer anisotropic media (Using VTI media as an example), which are also called solid-vacuum discontinuous surface, the constitutive relationship of the upper vacuum media is supposed to be $\tau^{-M1}=E^{M1}(c_{11}^-,c_{13}^-,c_{33}^-,c_{44}^-)\varepsilon^{-M1}$, and $c_{33}^- \to 0, c_{44}^-=0$. The constitutive relationship of the sublayer anisotropic media is $\tau^{-M2}=E^{M2}(c_{11}^+,c_{13}^+,c_{33}^+,c_{44}^+)\varepsilon^{-M2}$, and the constitutive relationship of equivalent average media is $\tau^{-A}=E^A(c_{11}^-,c_{13}^-,c_{33}^-,c_{44}^-,c_{11}^+,c_{13}^+,c_{33}^+,c_{44}^+)$, and $c_{33}^- \to 0, c_{44}^-=0$.

In the formula above, the elastic parameter of the anisotropic media is $c_{11},c_{13},c_{33},c_{44}$.

In the formula above, $\tau$ refers to a stress tensor matrix, C refers to elastic coefficient, M1 refers to a elastic media 1, M2 refers to a elastic media 2, A refers to the average media, E refers to a equivalent elastic coefficient matrix: $\lambda_1$, $\lambda_2$ and $\mu_1$, $\mu_2$ refer to a Lame constants, and $\varepsilon$ refers to a matrix of strain tensor.

In S1, for the anisotropic media, the anisotropic media $c_{11},c_{13},c_{33},c_{44}$ need to be imported. Then setting parameters such as differential order-number, type of seismic source, and seismic source frequency, and selecting the space step and the time step according to the initial forward model parameters.

Further, for Orthorhombic anisotropic media or Triclinic anisotropic media, the constitutive relationship of the upper vacuum media is supposed to be $\tau^{-M1}=E^{M1}(c_{11}^-,c_{12}^-,c_{13}^-,c_{22}^-,c_{23}^-,c_{33}^-,c_{44}^-,c_{55}^-,c_{66}^-)\varepsilon^{-M1}$. The constitutive relationship of the sublayer anisotropic media is $\tau^{-M2}=E^{M2}(c_{11}^+,c_{12}^+,c_{13}^+,c_{22}^+,c_{23}^+,c_{33}^+,c_{44}^+,c_{55}^+,c_{66}^+)\varepsilon^{-M2}$, and the constitutive relationship of equivalent average media is $\tau^{-A}=E^A(c_{11}^-,c_{12}^-,c_{13}^-,c_{22}^-,c_{23}^-,c_{33}^-,c_{44}^-,c_{55}^-,c_{66}^-,c_{11}^+,c_{12}^+,c_{13}^+,c_{22}^+,c_{23}^+,c_{33}^+,c_{44}^+,c_{55}^+,c_{66}^+)\varepsilon^{-A}$.

Figure 2:
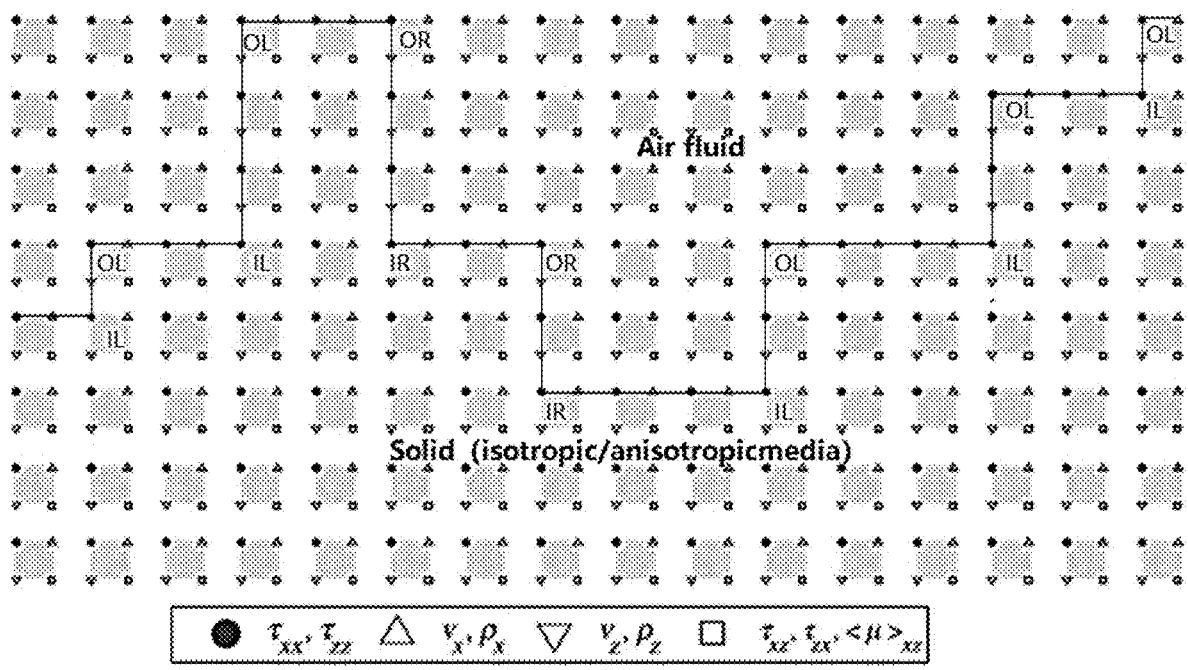
FIG. 2 shows a schematic diagram of free surface discretization in the embodiment of the present disclosure.

Further, starting a stepped discretization of a free surface of the initial forward model when a surface of the initial forward model fluctuates, and the discretization is shown in FIG. 1. And as shown in FIG. 2, turning an irregular undulating ground into a regular stepped grid, OL, OR in FIG. 2 refer to an outer corner point of grid point, and IL, IR refer to an inner corner point of grid point. FIG. 2 displays the implementation of undulating topography, divides the grid points of the free surface, and modifies the constitutive relations of different grid points according to Table 1.

Figure 3:
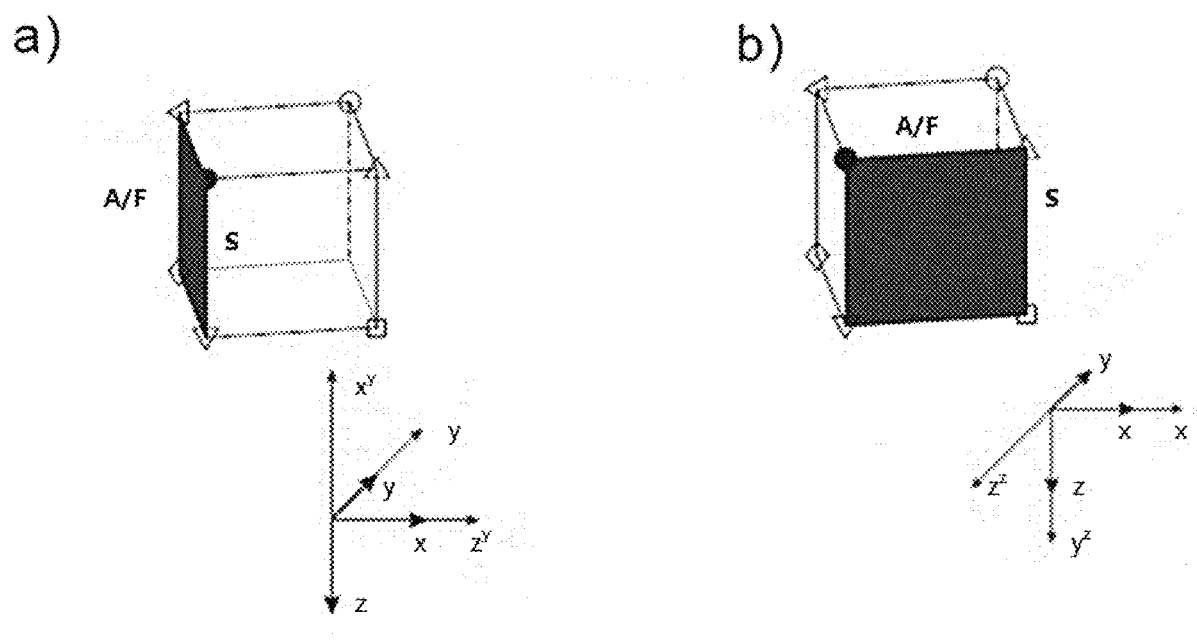
FIG. 3 shows a schematic diagram of the positional relationship between solid and air in the embodiment of the present disclosure; graph a) shows that on the left side of the free surface is air; graph b) shows that on the back side of the free surface is air.

In S4, using the media Parameter-modified method to correct a constitutive relationship and a density of non-horizontal points on the free surface, the constitutive relationship can be seen in table 1. In table 1, VL shows that on the left side of the free surface is air, VR shows that on the right side of the free surface is air, VB shows that behind the free surface is air, and H shows that above the free surface is air. Refer to FIG. 3 for more details. In FIG. 3, A/F represents the air or the fluid and S represents an underground media.

TABLE 1 the constitutive relationship of the undulating topography at the free surface;

| Categories | $\tau_{xx}$ | $\tau_{yy}$ | $\tau_{zz}$ | $\tau_{xy}$ | $\tau_{yz}$ | $\tau_{xz}$ | $\rho_x$ | $\rho_y$ | $\rho_z$ |
|---|---|---|---|---|---|---|---|---|---|
| VL | 0 | $\beta\varepsilon_{zz}+\alpha\varepsilon_{yy}$ | $\alpha\varepsilon_{zz}+\beta\varepsilon_{yy}$ | $2\mu\varepsilon_{xy}$ | $\mu\varepsilon_{yz}$ | $2\mu\varepsilon_{xz}$ | $\rho_x$ | $0.5\rho_y$ | $0.5\rho_z$ |
| VF | $\alpha\varepsilon_{xx}+\beta\varepsilon_{zz}$ | 0 | $\beta\varepsilon_{xx}+\alpha\varepsilon_{zz}$ | $2\mu\varepsilon_{xy}$ | $2\mu\varepsilon_{yz}$ | $\mu\varepsilon_{xz}$ | $0.5\rho_x$ | $\rho_y$ | $0.5\rho_z$ |
| VR | 0 | $\beta\varepsilon_{zz}+\alpha\varepsilon_{yy}$ | $\alpha\varepsilon_{zz}+\beta\varepsilon_{yy}$ | 0 | $\mu\varepsilon_{yz}$ | 0 | 0 | $0.5\rho_y$ | $0.5\rho_z$ |
| VB | $\alpha\varepsilon_{xx}+\beta\varepsilon_{zz}$ | 0 | $\beta\varepsilon_{xx}+\alpha\varepsilon_{zz}$ | 0 | 0 | $\mu\varepsilon_{xz}$ | $0.5\rho_x$ | 0 | $0.5\rho_z$ |
| H | $\alpha\varepsilon_{xx}+\beta\varepsilon_{yy}$ | $\beta\varepsilon_{xx}+\alpha\varepsilon_{yy}$ | 0 | $\mu\varepsilon_{xy}$ | $2\mu\varepsilon_{yz}$ | $2\mu\varepsilon_{xz}$ | $0.5\rho_x$ | $0.5\rho_y$ | $\rho_z$ |

In table 1, $\tau_{ij}$ refers to ijth component of the stress tensor, $\varepsilon_{ij}$ refers to ijth component of the strain tensor, $\lambda$ an $\mu$ refer to the Lame constants; and $\rho$ refers to density of the media; and $\alpha=(2\mu(\lambda+\mu)/(\lambda+2\mu))$, $\beta=(\mu\lambda)/(\lambda+2\mu)$.

Further, using the corrected constitutive relationship to modify the first-level parameters (the parameters at the free surface) of the initial forward model, and the influence of the free surface can be introduced without correcting the original finite difference method code. The constitutive relationship at the free surface is as follows:

$$\frac{\rho}{2}\frac{\partial^2 u_x}{\partial t^2}\bigg|_{z=0} = \frac{\partial \tau_{xx}}{\partial x} + \frac{\partial \tau_{xy}}{\partial y} + \frac{\partial \tau_{xz}}{\partial z},$$

$$\frac{\rho}{2}\frac{\partial^2 u_y}{\partial t^2}\bigg|_{z=0} = \frac{\partial \tau_{yx}}{\partial x} + \frac{\partial \tau_{yy}}{\partial y} + \frac{\partial \tau_{yz}}{\partial z},$$

$$\frac{\rho}{2}\frac{\partial^2 u_z}{\partial t^2}\bigg|_{z=0} = \frac{\partial \tau_{zx}}{\partial x} + \frac{\partial \tau_{zy}}{\partial y} + \frac{\partial \tau_{yz}}{\partial z},$$

$$\tau_{xx}|_{z=0} = \frac{2\mu(\lambda+\mu)}{\lambda+2\mu}\varepsilon_{xx} + \frac{\mu\lambda}{\lambda+2\mu}\varepsilon_{yy},$$

$$\tau_{yy}|_{z=0} = \frac{\mu\lambda}{\lambda+2\mu}\varepsilon_{xx} + \frac{2\mu(\lambda+\mu)}{\lambda+2\mu}\varepsilon_{yy},$$

$$\tau_{zz}|_{z=0} = 0,$$

$$\tau_{xy}|_{z=0} = \tau_{yx}|_{z=0} =, \mu\varepsilon_{xy},$$

$$\tau_{yz}|_{z=0} = \tau_{zy}|_{z=0} = 0,$$

$$\tau_{xz}|_{z=0} = \tau_{zx}|_{z=0} = 0,$$

$u_i$ refers to ith component of displacement, $\tau_{ij}$ refers to ijth component of the stress tensor, $\varepsilon_{ij}$ refers to ijth component of the strain tensor, $\lambda$ and $\mu$ refer to the Lame constants; and $\rho$ refers to density of the media.

Further, for the anisotropic media like a VTI media, the corrected constitutive relationship of VTI anisotropic media is as follows:

$$\begin{bmatrix} \tau_{xx} \\ \tau_{yy} \\ \tau_{zz} \\ \tau_{xy} \\ \tau_{yz} \\ \tau_{zx} \end{bmatrix} = \begin{bmatrix} (c_{11}c_{33}-c_{13}^2)/2c_{33} & ((c_{11}-2c_{66})c_{33}-c_{13}^2)/2c_{33} & 0 & 0 & 0 & 0 \\ ((c_{11}-2c_{66})c_{33}-c_{13}^2)/2c_{33} & (c_{11}c_{33}-c_{13}^2)/2c_{33} & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & c_{66}/2 \end{bmatrix} \begin{bmatrix} \varepsilon_{xx} \\ \varepsilon_{yy} \\ \varepsilon_{zz} \\ 2\varepsilon_{xy} \\ 2\varepsilon_{yz} \\ 2\varepsilon_{zx} \end{bmatrix}_{z=0}$$

Bringing the corrected constitutive relationship into a displacement stress equation:

$$\begin{cases} \frac{\rho}{2}\frac{\partial^2 u_x}{\partial t^2}\bigg|_{z=0} = \frac{\partial \tau_{xx}}{\partial x} + \frac{\partial \tau_{xy}}{\partial y} + \frac{\partial \tau_{xz}}{\partial z}, \\ \frac{\rho}{2}\frac{\partial^2 u_y}{\partial t^2}\bigg|_{z=0} = \frac{\partial \tau_{yx}}{\partial x} + \frac{\partial \tau_{yy}}{\partial y} + \frac{\partial \tau_{yz}}{\partial z}, \\ \frac{\rho}{2}\frac{\partial^2 u_z}{\partial t^2}\bigg|_{z=0} = \frac{\partial \tau_{zx}}{\partial x} + \frac{\partial \tau_{zy}}{\partial y} + \frac{\partial \tau_{yz}}{\partial z}, \end{cases}$$

$$\begin{cases} \tau_{xx}|_{z=0} = \frac{(c_{11}c_{33}-c_{13}^2)}{2c_{33}}\varepsilon_{xx} + \frac{((c_{11}-2c_{66})c_{33}-c_{13}^2)}{2c_{33}}\varepsilon_{yy} \\ \tau_{yy}|_{z=0} = \frac{((c_{11}-2c_{66})c_{33}-c_{13}^2)}{2c_{33}}\varepsilon_{xx} + \frac{(c_{11}c_{33}-c_{13}^2)}{2c_{33}}\varepsilon_{yy} \\ \tau_{zz}|_{z=0} = 0 \\ \tau_{xy}|_{z=0} = \tau_{yx}|_{z=0} = c_{66}\varepsilon_{yx} = c_{66}\varepsilon_{xy} \\ \tau_{yz}|_{z=0} = \tau_{zy}|_{z=0} = 0 \\ \tau_{xz}|_{z=0} = \tau_{zx}|_{z=0} = 0 \end{cases}$$

After the calculation of above formulas, the influence of the free surface in the case of the anisotropic media can be introduced.

The media Parameter-modified method for realizing an adaptive expression of an arbitrary discontinuous surface can be directly inherited and applied to the existing mainstream velocity-stress staggered grid finite fractional numerical program in the industry and academia, and the method can accurately fit the spatial position of the discontinuous surface because the method has no traditional grid offset error. The method can be achieved by simply correcting the media parameters of the grid points near the discontinuous surface, and the correction process only needs to be done once, the calculation is efficient and the operation is simple. The method can be applied to the high-order finite difference operator, achieving calculation accuracy equivalent to that based on the precise implementation of the weak solutions form of partial differential equations. The method is suitable for the discontinuous surface in the vicinity of the anisotropic media, and having a Poisson ration adaptive features. At the same time, this method is suitable to deal with various common anisotropic media free surface, such as VTI, HTI, TTI media, etc. Further, it can be extended to generalized anisotropic media, such as orthorhombic anisotropic media, triclinic anisotropic media, etc. The method is adaptive to Poisson's ratio for both isotropic and anisotropic media.

Although the preferred embodiments of the present disclosure have been described, but the skilled in the art can make additional changes and modifications to the embodiments once the skilled learn the basic creative concept. Therefore, claims are required to explain including preferred embodiments and all changes and modifications within the scope of the present disclosure.

Obviously, the skilled in the art can make various changes and modifications to the present disclosure without departing from the spirit and scope of the disclosure. If the modifications and changes of the present disclosure fall within the scope of the claims of the present disclosure and the claims' equivalent technologies, the present disclosure also intends to include the changes and modifications.

What is claimed is:

1. A media parameter-modified method for realizing an adaptive expression of an arbitrary discontinuous surface, comprising following steps:
   S1: importing an initial forward model, and the initial forward model includes a velocity and a density of vertical and horizontal waves, setting a seismic wavelet type and a main frequency parameter, and setting a space step and a time step according to initial forward model parameters;
   S2: selecting the space step and the time step according to the initial forward model parameters; and setting a differential order-number and a seismic wavelet;
   S3: starting a stepped discretization of a free surface of the initial forward model when a surface of the initial forward model fluctuates, and turning an irregular undulating ground into a regular stepped grid;
   S4: using a media Parameter-modified method to correct a constitutive relationship and a density of non-horizontal points on the free surface;
   S5: using a corrected constitutive relationship to replace an original constitutive relationship on the free surface, and an influence of the free surface introduced without correcting an original finite difference method code; and
   S6: for generalized anisotropic media, including orthorhombic anisotropic media and triclinic anisotropic media, bringing the corrected constitutive relationship into a finite difference method code to introduce the influence of the free surface.

2. The media parameter-modified method for realizing an adaptive expression of an arbitrary discontinuous surface according to claim 1, wherein: the free surface includes a fluid free surface and a solid free surface.

3. The media parameter-modified method for realizing an adaptive expression of an arbitrary discontinuous surface according to claim 1, wherein: a discontinuous surface includes a fluid-solid discontinuous surface and a fluid-vacuum discontinuous surface.

4. The media parameter-modified method method for realizing an adaptive expression of an arbitrary discontinuous surface according to claim 1, wherein: for the anisotropic media, anisotropic parameters are imported.

5. The media parameter-modified method for realizing an adaptive expression of an arbitrary discontinuous surface according to claim 1, wherein: the anisotropic media is suitable for a solid free surface part.

* * * * *